United States Patent [19]

Pettitt

[11] Patent Number: 4,745,765

[45] Date of Patent: May 24, 1988

[54] LOW REFRIGERANT CHARGE DETECTING DEVICE

[75] Inventor: Edward D. Pettitt, Newfane, N.Y.

[73] Assignee: General Motors Corporation, Detroit, Mich.

[21] Appl. No.: 48,371

[22] Filed: May 11, 1987

[51] Int. Cl.⁴ ............................................. G01K 13/00
[52] U.S. Cl. .......................................... 62/129; 62/209
[58] Field of Search ................. 62/126, 129, 225, 212, 62/214, 215, 209, 208, 149

[56] References Cited

U.S. PATENT DOCUMENTS

| | | | |
|---|---|---|---|
| 2,621,487 | 12/1952 | Warren | 62/126 X |
| 3,047,696 | 7/1962 | Heidorn | 62/209 X |
| 3,303,663 | 2/1967 | Miller et al. | 62/149 |
| 3,400,552 | 9/1968 | Johnson et al. | 62/149 |
| 3,729,949 | 5/1973 | Talbot | 62/129 X |
| 4,106,306 | 8/1978 | Saunders | 62/149 |

Primary Examiner—Harry B. Tanner
Attorney, Agent, or Firm—R. L. Phillips

[57] ABSTRACT

A low refrigerant charge detecting device comprises a refrigerant superheat temperature transducer that senses refrigerant leaving the evaporator and provides a positional output indicative of the superheat temperature of the sensed refrigerant, an ambient air temperature transducer that senses ambient air and provides a positional output indicative of the ambient air temperature, and a low charge signal effecter that responds to both the positional outputs and provides a low charge signal at predetermined refrigerant superheat and ambient air temperatures.

1 Claim, 2 Drawing Sheets

LOW REFRIGERANT CHARGE DETECTING DEVICE

TECHNICAL FIELD

This invention relates to low refrigerant charge detecting devices and more particularly to those for detecting low charge while the system is continuously running.

BACKGROUND OF THE INVENTION

In motor vehicle air conditioning systems, there have been various approaches to detecting when the refrigerant becomes too low for continued system operation and either signaling an alert or shutting the system off. For example, one approach, for cycling clutcn systems only, has been to measure the temperature change in the refrigerant at the point of entering the evaporator for a brief time on start up. This is accomplished with a thermistor with a large change in temperature indicating a low charge. Another means of detecting low charge has been to employ a temperature switch that senses compressor discharge temperature and shuts the compressor off or signals an alert when the temperature exceeds a certain high or abnormal temperature. Another way of detecting a low charge has been to sense the liquid level of the refrigerant in the receiver or accumulator as the case may be. This is accomplished with a float switch that is operated by the refrigerant liquid level diminishing to a certain low or abnormal level.

Another method of low refrigerant charge detection has been to use a suction superheat switch which senses suction pressure and suction gas temperature and indicates low charge when the super heat of the suction gas of the compressor reaches a certain value. This superheat switch was not biased or compensated by ambient temperature. Another way of detecting low refrigerant charge has been to use a pressure switch which senses compressor discharge pressure. This switch indicates low charge when the pressure switch senses low discharge pressure.

SUMMARY OF THE INVENTION

The present invention utilizes the finding by the inventor that in motor vehicle air conditioning systems that run continuously such as with a variable displacement compressor, the superheat temperature (degrees Fahrenheit above the saturation or boiling temperature) of the refrigerant exiting the evaporator is largely a function of charge (amount of refrigerant in the system) and ambient air temperature. The graph appearing in FIG. 1 of the accompanying drawing is an example of some of the test results that led to this finding. In these tests, the charge was progressively increased from a low or inefficient charge to the normal charge (0.75-2.75 lbs.) at progressively higher ambient air temperatures (60°-115° F.) and what are considered typical relative humidities for these temperatures (40-75%). As can be seen, the evaporator-out superheat increases dramatically with decreased charge and increasing ambient temperature at the normally associated relative humidities. And thus a device which could sense and have an action response to both these conditions could perform the desired low charge detecting function.

The low refrigerant charge detecting device of the present invention has this ability and comprises a refrigerant superheat temperature transducer, ambient air temperature transducer and a signal effecter. The superheat transducer senses the refrigerant leaving the evaporator and provides a positional output indicative of the superheat temperature thereof. The ambient transducer senses ambient air and provides a positional output indicative of the temperature thereof. And the signal effecter responds to both of the positional outputs and provides a low charge signal at a predetermined refrigerant superheat temperature and ambient air temperature. Preferably, the superheat transducer comprises two bellows which are connected to move one of two movable contacts of an electrical switch forming the signal effecter. One of the bellows is sealed with a certain amount of refrigerant therein and has a temperature probe exposed to the refrigerant leaving the evaporator such that this bellows becomes internally pressurized by the heat thereof in the superheat range. The other bellows is exposed to the refrigerant leaving the evaporator and in response to the pressure thereof provides a balancing force against the sealed bellows at the saturated state. The other switch contact forms the ambient transducer and is preferably a bimetal disk or is mounted on a cantilevered bimetal element. The bimetal member is exposed to the outside air and moves its contact relative to the other in response to ambient temperature change either in a single step manner or gradually in infinitesimal steps in the respective embodiments. The two bellows and bimetal member cooperate to control the relative positions of the electrical contacts such that they close to produce an alert signal or effect system shut down when a predetermined combination of evaporator-out superheat and ambient air temperature occurs indicating an undesirably low amount of refrigerant in the system.

With the above in mind, an object of the present invention is to provide a new and improved low refrigerant charge detecting device.

Another object is to provide a low charge refrigerant detecting device that senses the superheat temperature of the refrigerant leaving the evaporator and ambient air temperature to indicate the amount of charge.

Another object is to provide a low charge refrigerant detecting device employing a refrigerant superheat transducer formed of a bellows arrangement, an ambient air temperature transducer formed of a bimetal member and a signal effecter formed by a switch having movable contacts operated by the respective transducers.

BRIEF DESCRIPTION OF THE DRAWINGS

These and other objects, advantages and features of the invention will become more apparent from the following description and drawing in which in addition to FIG. 1; previously discussed.

DETAILED DESCRIPTION OF THE PREFERRED EMBODIMENT

Figure 2:
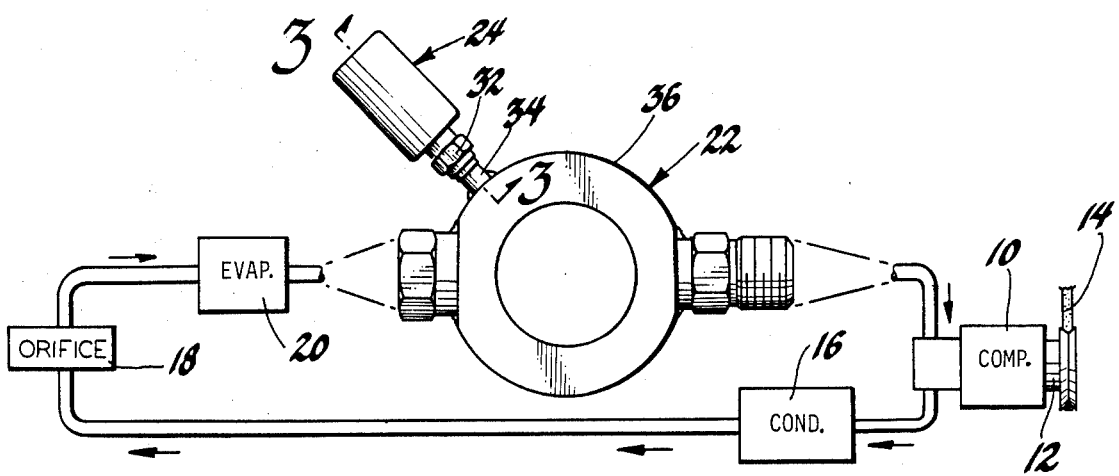
FIG. 2 is a schematic view of a motor vehicle air conditioning system that includes a top plan view of the accumulator/dehydrator with the low refrigerant charge detector according to the invention.

Referring to the drawing wherein the same numbers are used to identify the same parts throughout the several views, the system shown in FIG. 2 comprises a variable displacement refrigerant compressor 10 driven through an electromagnetic clutch 12 and belt 14 by the vehicle's engine (not shown). The compressor discharges hot vaporous refrigerant such as R12 to a condenser 16 for cooling resulting in liquefaction whereafter such is directed to an orifice tube expander 18. The latter reduces the pressure of the liquid refrigerant prior to passing on to an evaporator 20 where it absorbs heat from the ambient air thus cooling same. By absorbing heat from the air the liquid refrigerant vaporizes in the evaporator prior to passing on to an accumulator/dehydrator 22. At the latter, any water is collected and retained by a desiccant and any remaining liquid refrigerant is separated out and eventually returned in vapor form along with the other vaporous refrigerant to the suction side of the compressor to complete the cycle. The system thus far described is conventional with the displacement of the compressor being varied in accordance with the cooling demand rather than cycling the clutch off and on as would be the case with a fixed displacement compressor.

Figure 3:
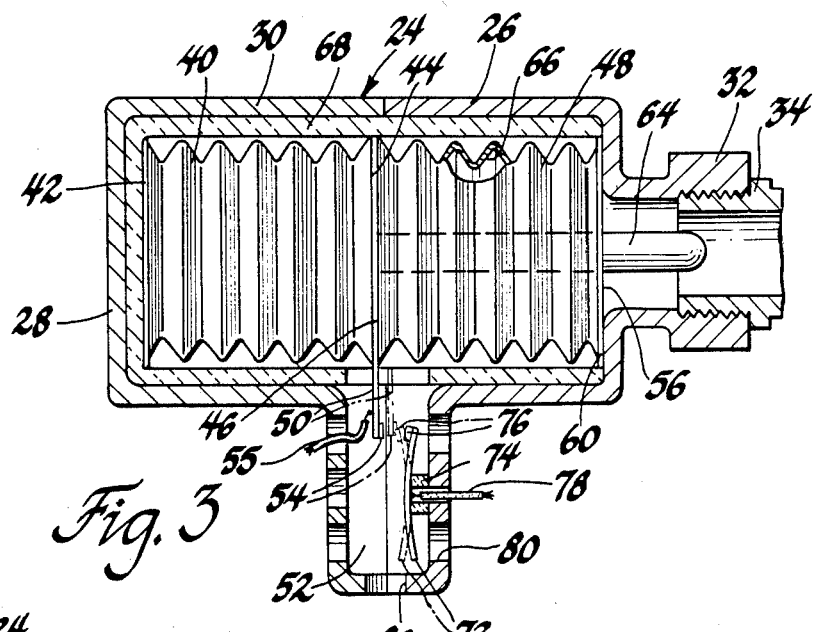
FIG. 3 is a sectional view of the detector in FIG. 2 taken along the line 3—3.

A low (abnormal or ineffective) amount or charge of refrigerant in the system is detected by a low refrigerant charge detecting device 24 located between the outlet of the evaporator and the suction side of the compressor and preferably fitted for convenience to the accumulator/dehydrator ( also simply called the accumulator or receiver). Referring to FIGS. 2 and 3, the detecting device comprises a two piece casing 26 that is closed at one end 28 and has at the other end of a cylindrical wall section 30 an integral internally threaded fitting 32 by which the device is attached to an existing externally threaded system access fitting 34 on the side of the accumulator's housing 36. A sealed corrugated tubular bellows 40 formed of metal and charged with a certain amount of refrigerant and which will be referred to as a saturation pressure bellows because of its function is located in the cylindrical wall section 30 of the casing and is retained at one closed end 42 thereof to the closed end 28 of the casing. Such end retention is obtained by pressure forces from the bellows assembly exerted on this end of the casing, i.e. under all conditions, the free length of this assembly which includes a second bellows whose detailed description follows is greater than the internal distance of the casing where it captures this assembly endwise. While this form of end retention is preferred, it will also be understood that some other form of retention such as cement could be used where a rigid connection may be more feasible. The other closed end 44 of the sealed bellows terminates approximately midway of the casing's cylindrical section where it is connected by soldering, brazing, welding or cementing to the closed end 46 of another corrugated tubular bellows 48 also of metal and together therewith by the same affixing means to an output arm 50. The arm 50 extends laterally out into a side cavity 52 formed in the casing to support a superheat contact 54 having an electrical lead or wire 55 that extends out of the casing and connects with a signal or control circuit (not shown) as described in more detail later.

The opposite end 56 of the latter bellows 48 which will be referred to as an evaporator out or accumulator pressure bellows because of its function is open unlike the sealed bellows and sealingly connected about its end perimeter 60 by soldering, brazing, welding or cementing to the interior of the casing where the latter is open through its fitting 32 to the interior of the accumulator and thus to the refrigerant leaving the evaporator. The end 44 of the saturation pressure bellows is formed with an integral tubular finger 64 that extends centrally therefrom and axially of this bellows and through the interior 66 of the evaporator out bellows 48 and terminates in the interior of fitting 32 to serve as a temperature sensing probe. A layer 68 of thermal insulation lines the interior of the casing at its closed end and cylindrical wall to shield both of the bellows from ambient air temperature with a slot 70 in the insulation layer allowing movement of the superheat output arm 50.

A bimetal disk 72 is located in the cavity 52 and fixed at its center on a pedestal 74 that is attached at its base to one side of this cavity. A contact 76 mounted on the perimeter of the disk 72 is located opposite the superheat contact 54 and electrically connected by a lead 78 along with the superheat lead 55 to the previously mentioned circuit which is of an otherwise conventional for suitable to operating for example an alert signal or shutting the system off. Perforations 80 in the wall of the cavity 52 provide for ambient air to the exterior of the bellows and to the disk 72 which is concave towards the superheat contact 54 at low ambient air temperatures and deflects to be concave away from this contact at high ambient air temperatures.

Describing now the calibration and operation of the detecting device, the charge in the saturation pressure bellows 40 is determined by conventional calculations and check by experimentation such that under all operating conditions there will exist a two phase (liquid and vapor) system therein at a given evaporator-out pressure and temperature sensed at the accumulator the evaporator out or accumulator bellows 48 will in response to the evaporator out pressure acting internally thereon exert a force against the saturation pressure bellows 40 proportional to the evaporator-out pressure. The saturation pressure bellows senses the evaporator out temperature through its probe 64 and becomes internally pressurized to the saturation pressure corresponding to this temperature and as a result exerts a force against the evaporator-out pressure bellows proportional to the saturation pressure. When the refrigerant out of the evaporator is at the saturated state (zero degrees superheat) the pressure on both bellows is equal and neither is deflected in this equilibrium condition and the arm 50 is positioned as shown in solid line. Then should the refrigerant out of the evaporator become superheated, the pressure in the saturated pressure bellows will become greater than the pressure of this refrigerant causing the former bellows to extend while the latter bellows contracts until static equilibrium is reached and whereupon the superheat contact 54 is moved by the arm 50 and positioned closer to the ambient air contact 76 as shown in phantom line. Alternatively, when the superheat decreases the reverse occurs moving the superheat contact further from the ambient air contact.

Figure 1:
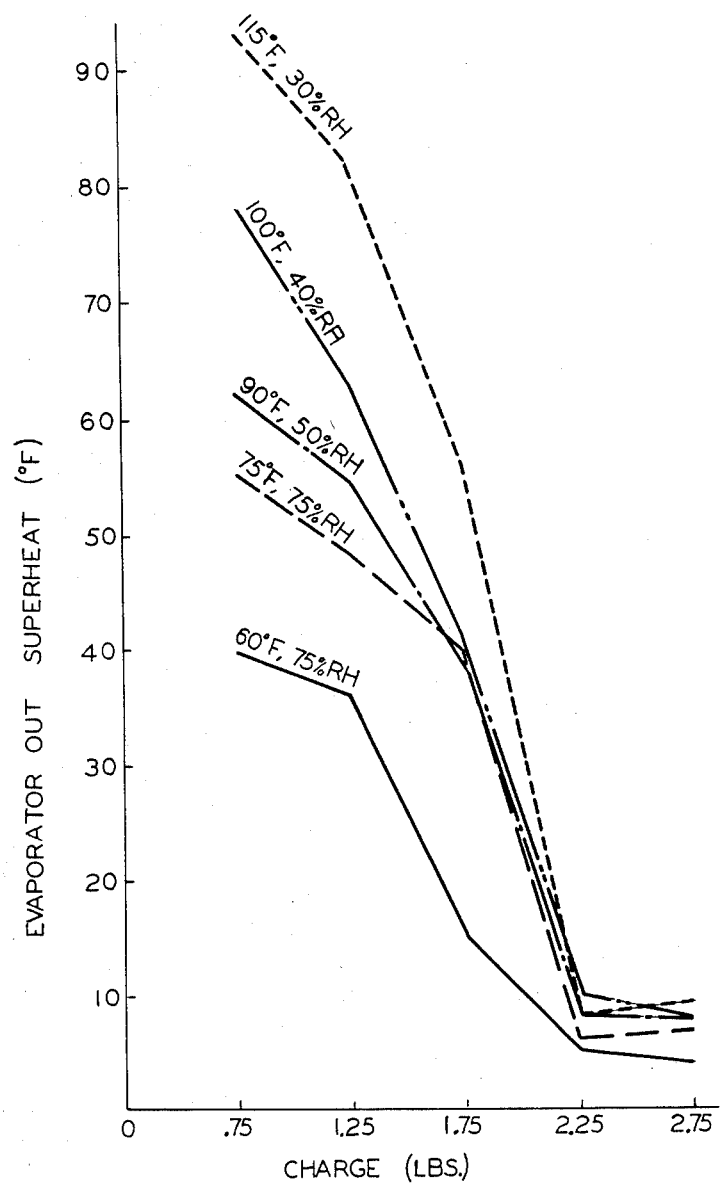

The ambient air temperature sensing bimetal disk is calibrated to be concave toward the superheat contact as shown in phantom line when the ambient or outside air temperature is below a certain value so that a small value of superheat (e.g. 10° F.) will cause contact or switch closure when the outside temperature is low (e.g. 50° F.). Alternatively, when the outside temperature is high (e.g. 100° F.) the bimetal disk will deflect so as to concave away as shown in solid line so that a substantially larger amount of superheat (e.g. 50° F.) is needed to cause contact at higher ambient air temperatures. Thus the signal effecter (i.e. the switch) formed by the two independently positioned contacts 54 and 76 detect low refrigerant charge based on the relationship of evaporator discharge superheat as a function of ambient air temperature and charge as shown in FIG. 1.

Figure 4:
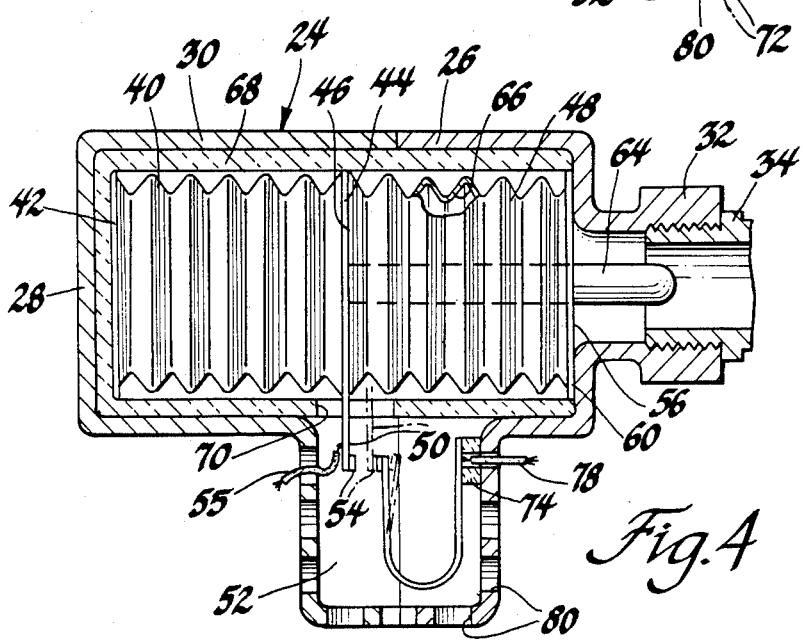
FIG. 4 is a view similar to FIG. 3 but showing another form of bimetal element in the ambient air transducer and signal effecter.

Another form that the ambient air switch portion may take is shown in FIG. 4. In this version, the bimetal element is in the form of a strip 80 that is bent in a U-shape, is fixed at one end to the casing, has the other end free and supporting the contact 76 and has its bimetal layers arranged so that the free end moves away from the superheat contact 54 at increasingly high outside air temperatures. As a result, the switch now operates in infinitesimal steps rather than one distinct step in response to ambient air temperature change so as to provide a closer degree of detection.

The above described preferred embodiments are illustrative of the invention which may be modified within the scope of the appended claim.

The embodiment of the invention in which an exclusive property or privilege is claimed are defined as follows:

1. In an air conditioning system charged with a refrigerant whose amount may diminish in time, said system including a evaporator, an improved low refrigerant charge detecting device comprising a sealed bellows containing refrigerant having a stationary end and an extendible end, said extendible end supporting an electrical contact and formed with a protruding temperature probe portion exposed to the refrigerant leaving the evaporator, an open bellows having a stationary end open to the refrigerant leaving the evaporator and an extendible end fixed to the extendible end of said sealed bellows about said probe portion, and a bimetal element exposed to ambient air supporting an electrical contact located opposite said first mentioned contact.

* * * * *